United States Patent [19]

Taniura

[11] Patent Number: 4,997,261
[45] Date of Patent: Mar. 5, 1991

[54] OPTICAL BEAM SPLITTER

[75] Inventor: Hiroshi Taniura, Tsuchiura, Japan

[73] Assignee: Think Laboratory Co., Ltd., Chiba, Japan

[21] Appl. No.: 365,557

[22] Filed: Jun. 13, 1989

[30] Foreign Application Priority Data

Jul. 7, 1988 [JP] Japan .................. 63-169289

[51] Int. Cl.$^5$ .................. G02B 27/10; G02B 27/14
[52] U.S. Cl. .................. 350/171; 350/169; 350/172; 350/173; 350/401; 350/402; 350/404
[58] Field of Search ............... 350/169, 404, 401, 402, 350/171, 172, 173

[56] References Cited

U.S. PATENT DOCUMENTS

| 2,403,731 | 7/1946 | MacNeille | 350/171 |
| 4,367,921 | 1/1983 | Sawamua et al. | 350/171 |
| 4,627,688 | 12/1986 | Kobayashi et al. | 350/173 |

FOREIGN PATENT DOCUMENTS 52-122135 10/1977 Japan.
58-010713 1/1983 Japan.

Primary Examiner—Bruce Y. Arnold
Assistant Examiner—James Phan
Attorney, Agent, or Firm—Koda & Androlia

[57] ABSTRACT

An optical beam splitter which splits a single light into a plurality of split beams including a plurality of transparent plates of uniform thickness arranged in a stack with fully reflective films coated on the transparent plates at both ends of the stack and semi-reflective films coated on the remaining transparent plates in the stack. The reflectivities of the individual semi-reflective films gradually increase from one end to the other in the stack and a beam entering the stack is first entirely reflected by the back-end fully reflective film, then passes through the semi-reflective films while being reflected partially by the semi-reflective films, and then finally entirely reflected by the front-end fully reflective film so that a single beam is split into a plurality of parallel split beams.

2 Claims, 1 Drawing Sheet

OPTICAL BEAM SPLITTER

BACKGROUND OF THE INVENTION

1. Field of the Invention

The present invention relates to an optical beam splitter used in recording halftone plate duplicate images.

2. Prior Art

There exists an optical beam splitter which is used in recording halftone plate duplicate images on a recording material by controlling a light-exposure device in accordance with image signals obtained by photoelectric manipulation of an original image so that a plurality of beams are independently modulated by the image signals.

In the conventional method, a multiple number of light beams, which are lined up in a row, are independently modulated by image signals so that they are relatively scanned on the surface of recording materials. In most cases, the multiple number of light beams are obtained by reflecting a single light beam, which comes from an argon laser, on a plurality of fully reflective and semi-reflective mirrors so that the beam is split by these mirrors. The light beams thus obtained are independently modulated by a modulator, reduced in diameter by a crystal optical system and then directed onto the surface of the recording material.

It is also a prior art practice for a single light beam to be split into a multiple number of light beams lined up in a row by repeating internal reflections of the light beam using a single optical beam splitter. This method is disclosed, for example, in Japanese Patent Application Laid-Open Nos. 52-122135 and 58-10713. In this art, one surface of a single glass plate is coated with a fully reflective film, while the other surface of the glass plate is coated in different regions with semi-reflective films having different reflectivities.

These semi-reflective film coatings are described in greater detail as follows:

When a single light beam is to be split into ten (10) light beams, for example, the first region is coated with a semi-reflective film having a reflectivity of 9/10 (i.e., a transmissibility of 1/10); the next region is coated with a semi-reflective film having a reflectivity of 8/9 (i.e., a transmissibility of 1/9). The next region is coated with a semi-reflective film having a reflectivity of ⅞ (i.e., a transmissibility of ⅛), and the successive regions are coated with semi-reflective films having reflectivities gradually decreasing in a numerical series so that the last region is coated with a semi-reflective film having a reflectivity of ½ (i.e., a transmissibility of ½).

The techniques in which a single laser beam generated by an argon laser is split into a multiple number of laser beams via mirrors and optical fibers as described above requires a large amount of space for installation of the apparatus. Also, adjustment of the mirrors and optical fibers requires a high degree of skill and considerable time and is therefore very inconvenient.

The above-mentioned spatial drawbacks are eliminated by the optical beam splitters described in Japanese Patent Application Laid Open Nos. 58-10713 and 52-122135. In these optical beam splitters, however, in order for a single light beam to be split into ten (10) light beams, semi-reflective coatings having different reflectivities as described above must be coated in nine extremely narrow regions, i.e. regions with a width of 2 mm or less. Flaw in the coating work, even to one region, is not permissible, and therefore, this coating process is extremely difficult.

The optical beam splitter disclosed in Japanese Patent Application Laid-Open No. 52-122135 is advantageous in that there is no need to increase the size of the crystal optical system even if the single beam is split into a large number of beams. However, since the split light beams are not parallel, the modulation efficiency of the modulator drops, and light leakage may occur. Furthermore, the formation of the acoustic electrodes of the modulator is very difficult. It is also difficult to maintain the thickness and angular position of the two surfaces of this optical beam splitter at prescribed values with an ultrahigh degree of precision. Thus, the manufacture of this optical beam splitter involves great difficulty. If the thickness and angular positions of the two surfaces of the optical beam splitter differ even slightly from the predetermined values, the focal distances of the various light beams become greatly different. Thus, the spacing between the optical beam splitter and modulator, as well as the spacing between the modulator and crystal optical system, will be unavoidably different in each individual apparatus.

SUMMARY OF THE INVENTION

Accordingly, it is a primary object of the present invention to provide an optical beam splitter which allows the formation of large semi-reflective films so as to facilitate the formation of semi-reflective films with highly accurate reflectivities.

It is a further object of the present invention to provide an optical beam splitter which does not require a large amount of space.

It is a still further object of the present invention to provide a beam splitter which can split a light beam so that the light quantities of the resulting split beams are equal.

The abovementioned objects of the present invention are accomplished by a unique structure for optical beam splitters wherein a plurality of transparent plates (for example n [n=integer]) of uniform thickness (to a high degree) are stacked together in parallel. First and second fully reflective films are applied on two transparent plates which are at both ends of the stack, and semi reflective films are provided on the surfaces of the remaining transparent parallel plates of the stack. The semi-reflective films have respective reflectivities gradually increasing from the one at the back-end of the stack toward the front-end of the stack in numerical series such as $1/n$, $1/(n-1)$, $1/(n-2)$, ... ¼, ⅓ and ½.

The fully reflective films and semi-reflective films are arranged so that a light beam entering the stack of the transparent parallel plates is first entirely reflected by the fully reflective film which is at the back-end of the stack and then passes through the semi-reflective films until it reaches the second fully reflective film so that the light beam is totally reflected by the second fully reflective film. Split light beams into which the original light beam is split when it passes through the stack of transparent parallel plates having semi-reflective films are radiated out of the stack of the transparent parallel plates.

As to the semi-reflective films, since the reflectivity of those through which the reflected light beam passes is $1/n$, $1/n$th of the quantity of light of the light beam is reflected and split off toward the back end of the stack, while the remaining $(n-1)/n$ths of the quantity of light of the light beam passes through the semi-reflective film and travels toward the next semi-reflective film. Since the reflectivity of the next semi-reflective film is 1/(n−1), 1/nth of the quantity of light of the light beam which has passed through the previous semi-reflective film is reflected and split off toward the back end of the stack, while the remaining (n−2)/nths of the quantity of light of the light beam passes through the next semi-reflective film, and so on. Thus, beam splitting is repeated as the remaining light passes through each successive semi-reflective film until the light reaches the second fully reflective film of the plate at the front end of the stack and is reflected toward the back end of the stack, thus producing a plurality of, for example in the number D, split lights. In particular, since the reflectivities of the semi-reflective films increase gradually in a numerical series such as 1/n, 1/(n−1), 1/(n−2), ... ¼, ⅓, ½ as described above, each of the split light beams has 1/nth of the quantity of light of the light beam, and the split light beams are radiated from the back end of the stack parallel to each other.

Furthermore, the optical beam splitter of this invention can also be constructed so that transparent parallel plates are sandwiched between two additional transparent parallel plates to fully protect the fully reflective films from dust and allow both surfaces to be wiped.

DETAILED DESCRIPTION OF THE INVENTION

Figure 1A:
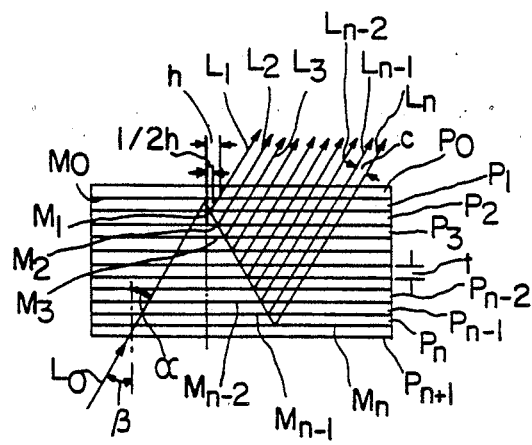
FIG. 1(a) is a side view of a first embodiment of the optical beam splitter of the present invention.

In FIG. 1(a), n+2 (n being an integer) transparent plates are stacked together. These n+2 transparent plates P0, P1, P2, P3, ... Pn−1, Pn, and Pn+1 are obtained by cutting out a single oblong transparent plate P having a uniform thickness into n+2 plates along the single-dot chain lines shown in FIG. 1(b). Thus, the thicknesses of the transparent plates P0 through Pn+1 are exactly the same to a high degree of precision.

Figure 1B:
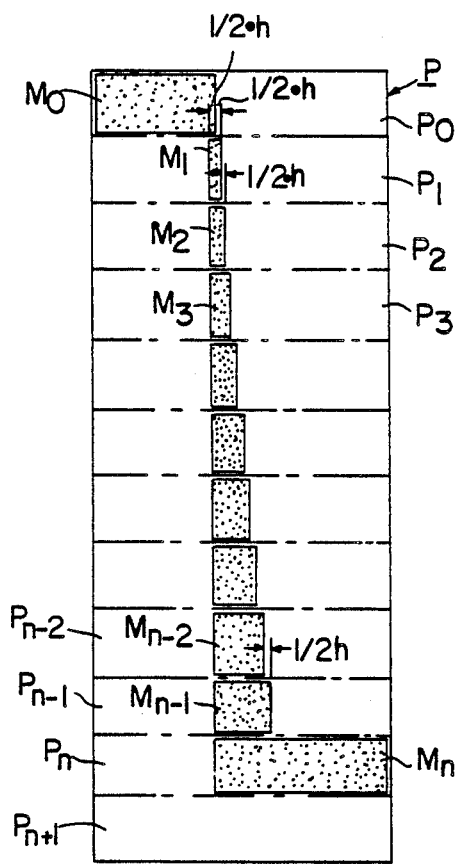
FIG. 1(b) is a top view of the surface of a transparent plate which is used to manufacture the optical beam splitter of FIG. 1(a);.

Before the transparent plate P, shown in FIG. 1(b), is cut into n+2 pieces of individual plates P0 through Pn+1, a fully reflective film M0 is applied to the plate P0 semi-reflective films M1, M2, M3, ... Mn−2, and Mn−1 are applied to the plates P1 through Pn, and another second fully reflective film Mn is applied to the plate Pn+1. These films have different sizes and are applied to the plates in different prescribed positions. The application of the films on each plate can be achieved in any coating methods.

In this embodiment, the beam splitter is constructed so that ten split light beams are obtained (n=10), and the transparent plate P is cut into 12 pieces. The reflectivity of the semi-reflective film M1 is set at 1/10 (i.e., a transmissibility of 9/10), the reflectivity of the semi-reflective film M2 is set at 1/9 (i.e., a transmissibility of 8/9), the reflectivity of the semi-reflective film M3 is set at ⅛ (i.e., a transmissibility of ⅞), and so on, so that the reflectivity of the semi-reflective film Mn−2 is set at ⅓ (i.e., a transmissibility of ⅔) and the reflectivity of the semi-reflective film Mn−1 is set at ½ (i.e., a transmissibility of ½). Thus, each of the ten split light beams L1, L2, L3, ... Ln−1, and Ln shown in FIG. 1(a) has 1/10 of the quantity of light of the light beam L0.

The width of the semi-reflective film M1 is set equal to the small dimension h shown in FIG. 1(a). The width of the semi-reflective film M2 is 3/2 h, the width of the semi reflective film M3 is 2 h, and so on, so that the width of the semi-reflective film Mn−2 is 4 h+½ h, and the width of the semi-reflective film Mn−1 is 5 h. These semi-reflective films M1 through Mn−1 are all applied with their respective left ends precisely aligned.

The first fully reflective first film M0 is formed as a large film with the right end thereof pulled in by a distance of ½ h from the right end of the semi-reflective film M1, and with the left end of the film M0 extending to the vicinity of the left edge of the plate P. The second fully reflective film Mn is also formed as a large film with the left end thereof aligned with the left end of the semi-reflective film Mn−1 and the right end extending to the vicinity of the right edge of the transparent plate P.

The transparent plate P coated with the reflective films M0 through Mn is cut along the single-dot chain lines shown in FIG. 1(b) and split into 12 pieces of plates, and these plates are stacked together as shown in FIG. 1(a).

Plates having reflective films M0 through Mn are arranged in a 3-dimentional stack such that a light beam L0 entering the stack of transparent parallel plates at a prescribed oblique angle from one end (front-end) of the stack is not interrupted by the second fully reflective film Mn or the semi-reflective films M1 through Mn−1.

With the above-described structure, the light beam L0 reaches the back-end first fully reflective film M0 and is entirely reflected toward the front-end of the stack so that the light beam L0 passes through all of the semi-reflective films M1, M2, M3, ... Mn−2. At each of the semi-reflective films M1, M2, M3, ... Mn−2, a split light beam L1, L2, L3, ... and Ln−2 is reflected toward the back of the stack, in other words towards the back-end transparent plate P0. The light reaching the semi-reflective film Mn−1 is reflected and split into a split light beam Ln−1 which travels back toward the back-end of the stack and a split light beam Ln travels toward the front-end of the stack, in other words towards the transparent plate Pn+1. Finally, the split light beam Ln is entirely reflected by the fully reflective second film Mn so that beam Ln travels back toward the back-end of the stack.

More specifically, the light beam which enters the stack of the transparent parallel plates at a prescribed oblique angle α from the front-end of the stack is first entirely reflected by the first fully reflective film Mo at the back-end of the stack and directed toward the semi-reflective films located in front of the second fully reflective film Mn. Since the reflectivity of the semi-reflective film M1 through which the reflected light beam passes is 1/n, 1/nth of the quantity of light of the light beam is reflected and split off toward the back-end of the stack, while the remaining (n−1)/nths of the quantity of light of the light beam passes through the semi-reflective film M1 and travels toward the next semi-reflective film M2. Since the reflectivity of the next semi-reflective film M2 is 1/(n−1), 1/nth of the quantity of light of the light beam which has passed through the previous semi-reflective film M2 is reflected and split off toward the back end of the stack, while the remaining (n−2)/nths of the quantity of light of the light beam passes through the semi-reflective film M2, and so on. Thus, similar beam splitting is repeated as the remaining light passes through the successive semi-reflective films until the light reaches the second fully reflective film Mn of the plate Pn at the front-end of the stack. The fully reflective second film Mn then reflects the light beam which has passed through the semi-reflective films toward the back-end of the stack, thus producing n split lights.

In particular, since the reflectivities of the semi-reflective films increase gradually in numerical series such as $1/n$, $1/(n-1)$, $1/(n-2)$, ... $\frac{1}{4}$, $\frac{1}{3}$, and $\frac{1}{2}$ as described above, each of the split light beams has 1/nth of the quantity of light of the light beam.

Furthermore, since the reflectivity of the semi-reflective film Mn−2 is $\frac{1}{3}$, a split light beam Ln−2 with 1/nth of the quantity of light of the light beam L0 is split off toward the back-end of the stack by this semi-reflective film Mn−2, while a light beam with the remaining 2/nths of the quantity of light of the light beam L0 passes through the semi-reflective film Mn−2 and travels toward the semi-reflective film Mn−1. Since the reflectivity of the semi-reflective film Mn−1 is $\frac{1}{2}$, a split light beam Ln−1 with 1/nth of the quantity of light of the light beam L0 is split off toward the back end of the stack by the semi reflective film Mn−1, while the remaining 1/nth of the quantity of light of the light beam L0 passes through the semi-reflective film Mn−1 and travels toward the front-end fully reflective film Mn.

Further, since the semi-reflective films M1 through Mn−1 consist of a group of semi-reflective films whose reflectivities increase gradually in numerical series $1/n$, $1/(n-1)$, $1/(n-2)$, ... $\frac{1}{4}$, $\frac{1}{3}$, and $\frac{1}{2}$ as described above, each of the abovementioned split light beams L1 through Ln has 1/nth of the quantity of light of the light beam L0, and the split light beams L1 through Ln are radiated from the back end of the stack parallel to each other.

The small dimension h shown in FIG. 1(a) is determined by the angle of travel α of the light beam L0 through the stack and the thickness t of the transparent plates. Specifically, the dimension h is determined by the following equation:

$$h = 2t \times \tan \alpha$$

Furthermore, the traveling angle α of the light beam L0 traveling through the stack is determined by the angle of incidence β of the light beam L0 and the refractive index of the transparent plate P. Accordingly, the space C of the split light beams is determined by the angle of incidence β of the light beam L0, the refractive index of the transparent plate P and the thickness t of the transparent plate P. Thus, the thickness t of the transparent plate P can be fixed by determining the space C of the split light beams, the angle of incidence β of the light beam L0 and the material of the transparent plate P. In this way, the manufacturing conditions of the multi-coated plate shown in FIG. 1(b) can all be determined.

Figure 2A:
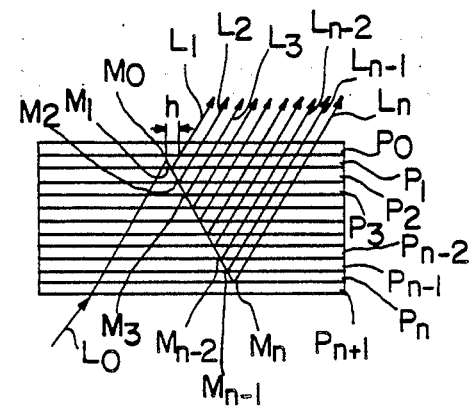
FIG. 2(a) is a side view of a second embodiment of the optical beam splitter of the present invention.
Figure 2B:
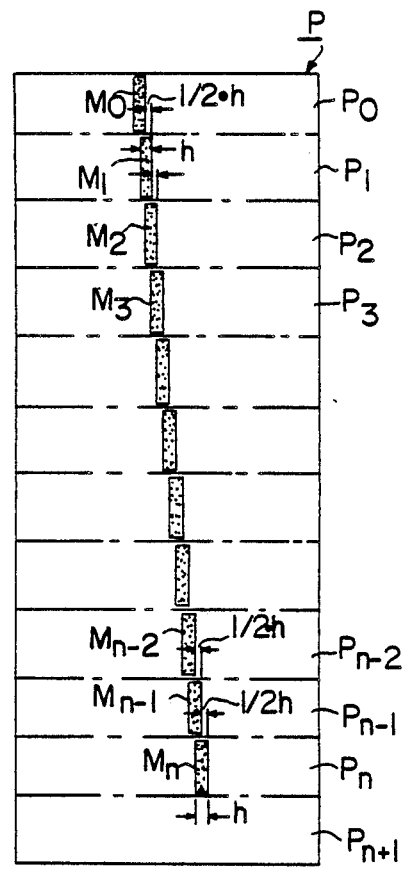
FIG. 2(b) is a top view of the surface of a transparent plate which is used to manufacture the optical beam splitter of FIG. 2(a).

FIGS. 2(a) and 2(b) illustrate the second embodiment of the optical beam splitter of this invention. The optical beam splitter of FIG. 2(a) is constructed in the same manner as the one shown in FIG. 1(a) except for the size of the reflective films. In particular, twelve transparent plates P0, P1, P2, P3, ... Pn−1, Pn, and Pn+1 are stacked together, and the reflective films M0 through Mn on the plates P0 through Pn all have a width h and are successively shifted by a distance $\frac{1}{2}$ h.

The thickness of the transparent plates P0 through Pn+1 are uniform to a high degree. The transparent plate P of FIG. 2(b), which is oblong in shape and has a uniform thickness, is cut along the single-dot chain lines and is thus split into twelve plates. These twelve plates are then stacked together, and before the transparent plate P is split, the plate P is coated with the fully reflective film M0, semi-reflective films M1, M2, M3, ... Mn−2, and Mn−1 and fully reflective film Mn.

The fully reflective film M0 entirely reflects the light beam L0 entering from the front of the stack back toward the front-end of the stack. Each of the semi-reflective films M2, M3, ... Mn−2 splits off a split light beam L1 through Ln−2 (which has 1/nth of the quantity of light of the light beam L0) toward the back-end of the stack. The semi-reflective film Mn−1 splits off a split light beam Ln−1 which has 1/nth of the quantity of light of the light beam L0 toward the back-end of the stack and allows another split light beam Ln which has 1/nth of the quantity of light of the light beam L0 to travel toward the front-end of the stack. Then finally, the second fully reflective film Mn entirely reflects the split light beam Ln toward the back-end of the stack.

The optical beam splitters described above can also be constructed so that stacked transparent parallel plates are sandwiched between two additional transparent parallel plates to fully protect the reflective films from dust and allow both surfaces to be wiped.

Accordingly, the optical beam splitter according to the present invention has the following advantageous features:

It can split a beam into split beams having an equal quantity of light.

The semi-reflective films can be formed as large films so that accurate reflectivities can be obtained.

A large amount of space is not necessary to install the splitter.

I claim:

1. An optical beam splitter comprising:
   a plurality of n (n=integer) transparent plates of uniform thickness to a high degree of precision assembled in a stack;
   a plurality of fully reflective films provided on the surfaces of said transparent plates which are at both ends of said stack; and
   a plurality of semi-reflective films provided on the surfaces of adjacent transparent plates in the stack, reflectivities of said semi-reflective films gradually increasing from the plate at the back end of said stack toward front-end of said stack in a numerical series $1/n$, $1/(n-1)$, $1/(n-2)$, ... $\frac{1}{4}$, $\frac{1}{3}$, and $\frac{1}{2}$, and said fully reflective films and semi-reflective films being arranged such that a light beam entering said stack of transparent plates at a prescribed angle from one end of said stack is first entirely reflected by said back-end fully reflective film and then passes through said semi-reflective films to be entirely reflected by said front-end fully reflective film so that split light beams which said light beam is split into while passing through said semi-reflective films and said fully reflective film are reflected out of said stack.

2. A optical beam splitter according to claim 1, wherein said stack of transparent plates are sandwiched between two additional transparent plates.

* * * * *